United States Patent [19]
Hasushita et al.

[11] Patent Number: 6,125,238
[45] Date of Patent: Sep. 26, 2000

[54] REAL IMAGE TYPE FINDER OPTICAL SYSTEM

[75] Inventors: Sachio Hasushita, Tokyo; Tetsuya Abe; Takaaki Yano, both of Hokkaido, all of Japan

[73] Assignee: Asahi Kogaku Kogyo Kabushiki Kaisha, Tokyo, Japan

[21] Appl. No.: 09/120,198

[22] Filed: Jul. 22, 1998

[30] Foreign Application Priority Data

Jul. 22, 1997 [JP] Japan .................................. 9-211368

[51] Int. Cl.$^7$ .......................... G03B 17/20; G03B 13/08
[52] U.S. Cl. .......................................... 396/296; 396/386
[58] Field of Search ................................ 396/296, 373, 396/385, 386

[56] References Cited

U.S. PATENT DOCUMENTS

| | | | |
|---|---|---|---|
| 3,575,082 | 4/1971 | McClune | 396/386 |
| 4,429,978 | 2/1984 | Ikari | 396/386 |
| 5,400,101 | 3/1995 | Yoneyama et al. . | |
| 5,410,430 | 4/1995 | Ito et al. . | |
| 5,754,900 | 5/1998 | Suda | 396/296 |

FOREIGN PATENT DOCUMENTS 9-113962  5/1997  Japan .

OTHER PUBLICATIONS

Copy of an English Language Translation of JP No. 9–113962, May 20, 1997.

Primary Examiner—David M. Gray
Attorney, Agent, or Firm—Greenblum & Bernstein, P.L.C.

[57] ABSTRACT

Disclosed is a real image type finder optical system which is provided with an objective optical system having a positive power, an erecting optical system for erecting a reversed real image formed by the objective optical system, an eyepiece optical system for observing the real image formed by the objective optical system and erected by the erecting optical system, an information display element provided in the objective optical system, the information display element displaying information to be observed in a field of view of the finder optical system, and a partial mirror surface provided on an object side with respect to the information display element, the partial mirror allowing a part of light from the object to pass therethrough and reflecting light from the information display element towards the eyepiece optical system.

24 Claims, 15 Drawing Sheets

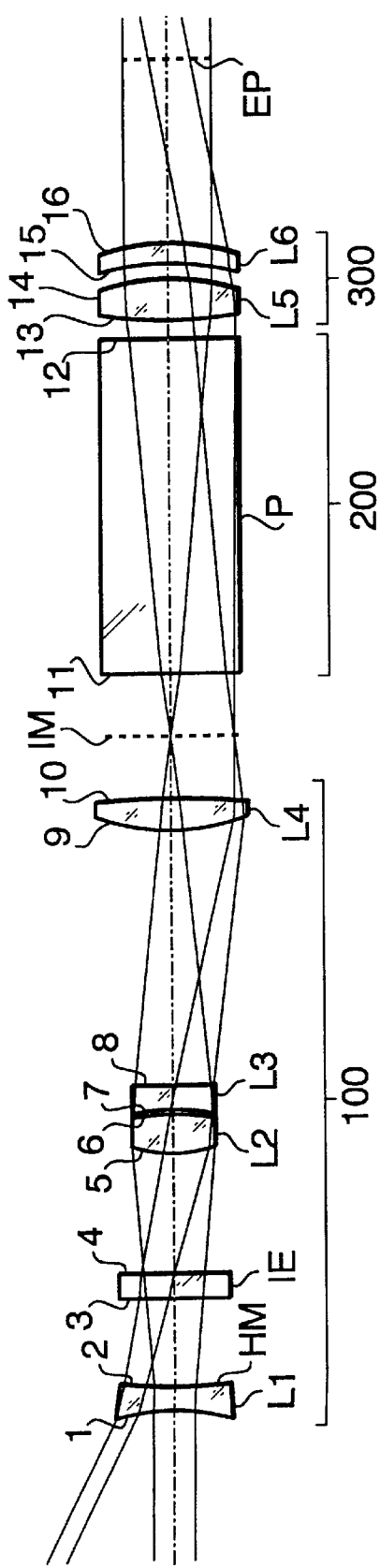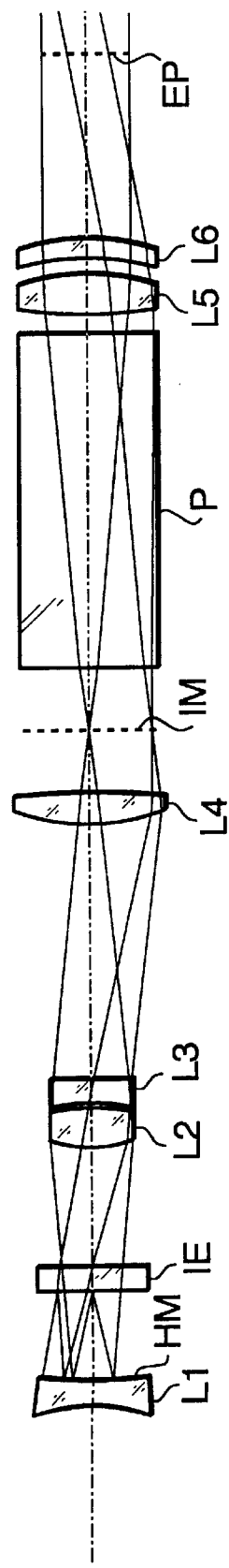
FIG. 1A
FIG. 1B

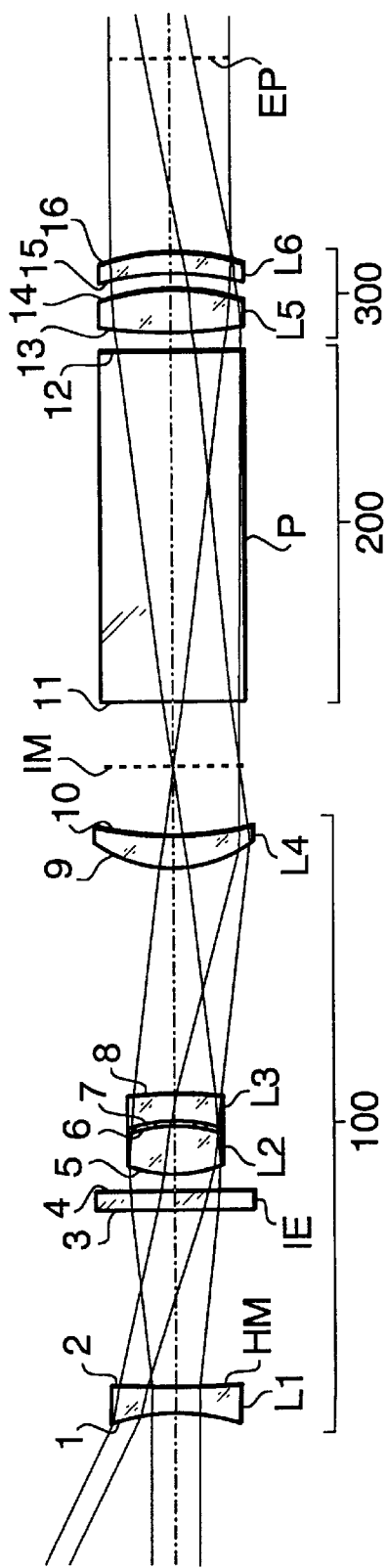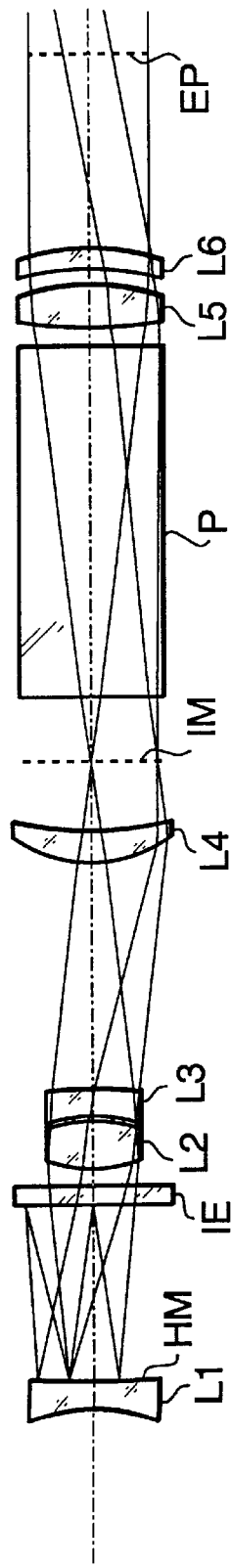
FIG. 6A
FIG. 6B

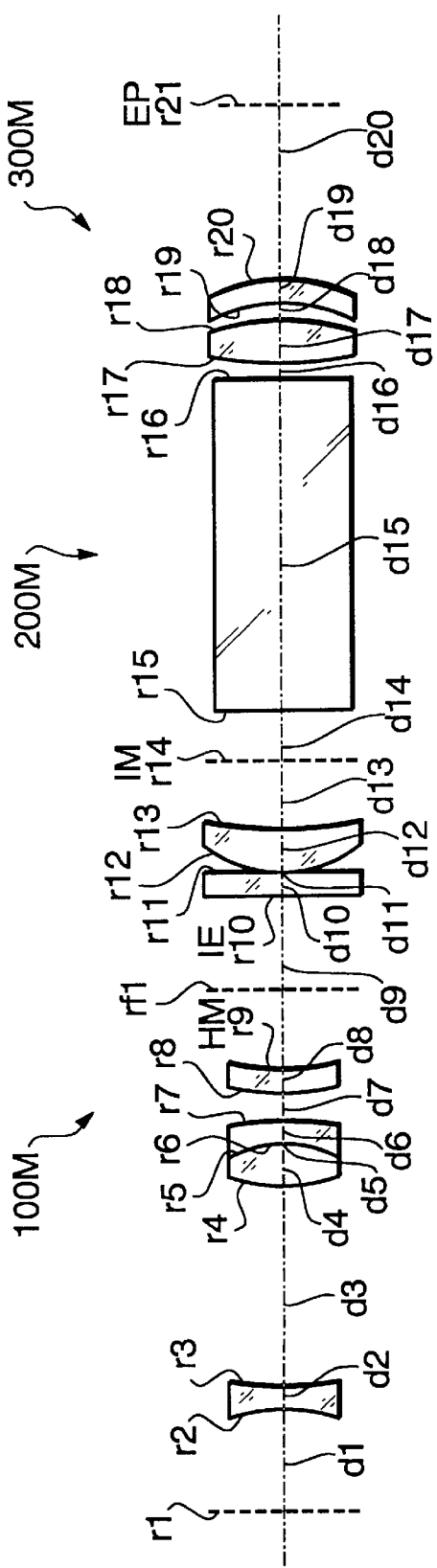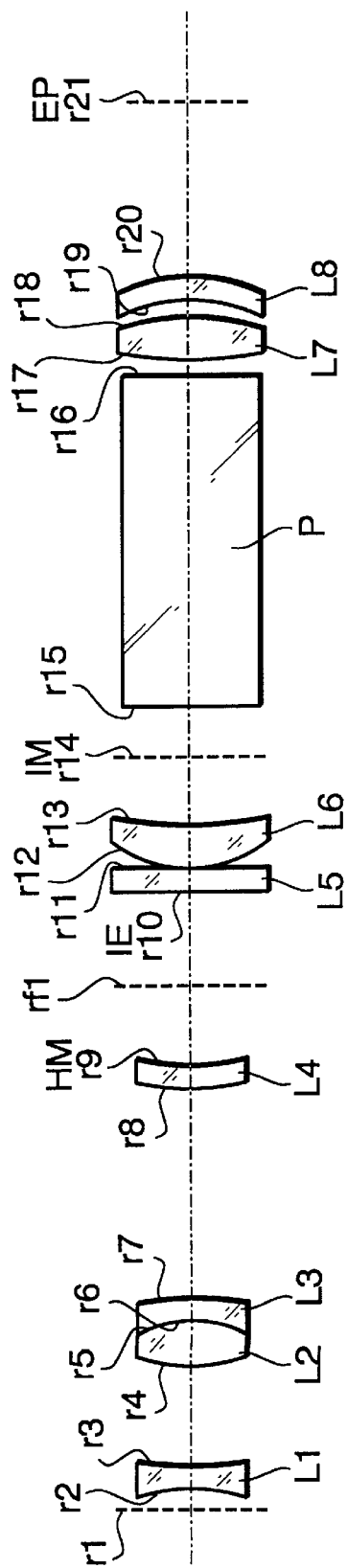
FIG. 7A
FIG. 7B

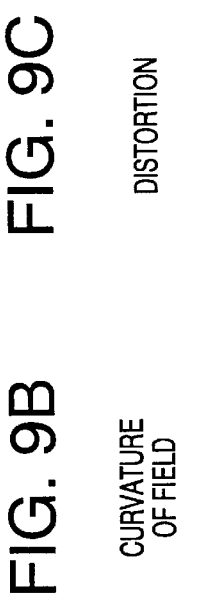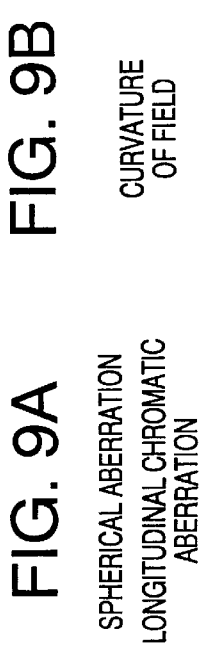

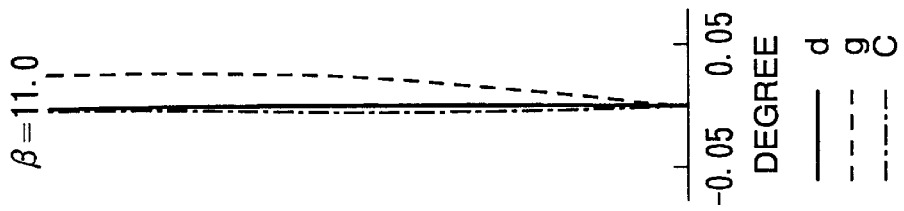
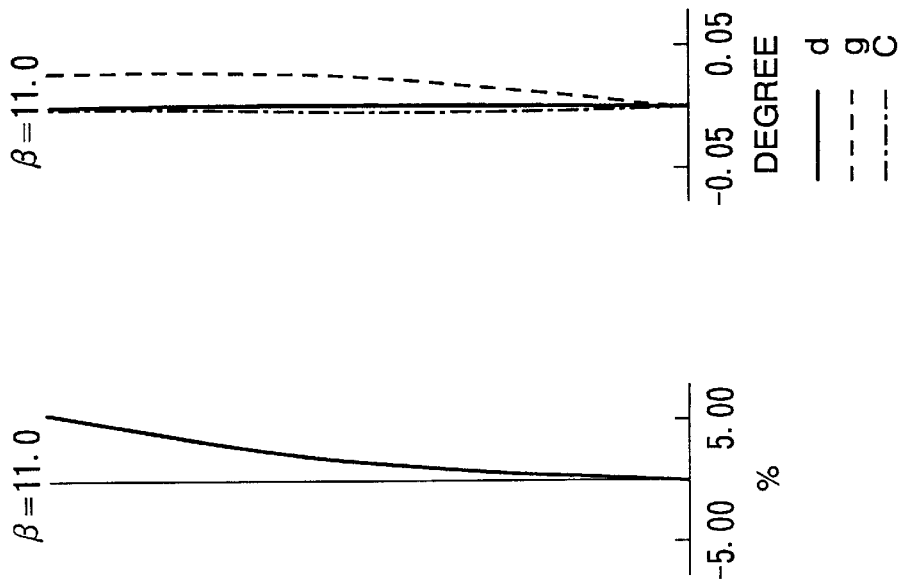
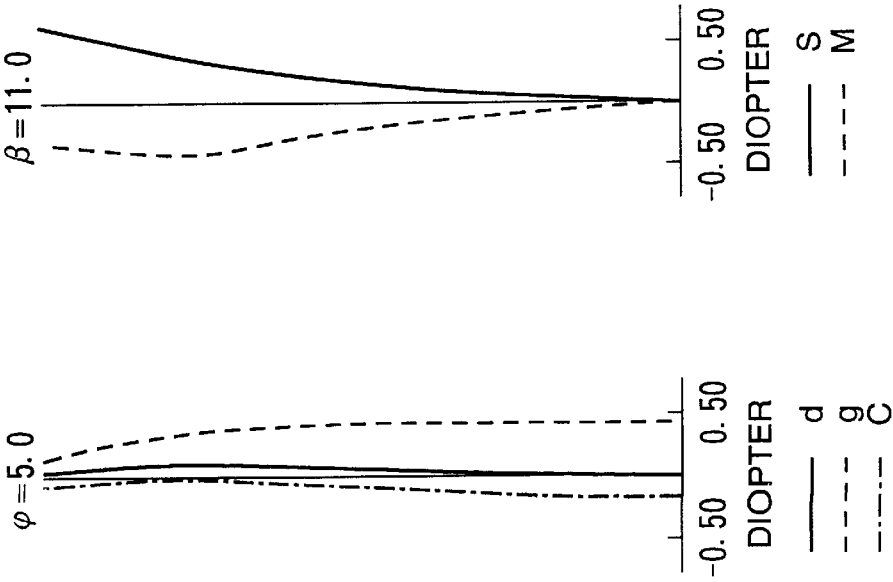

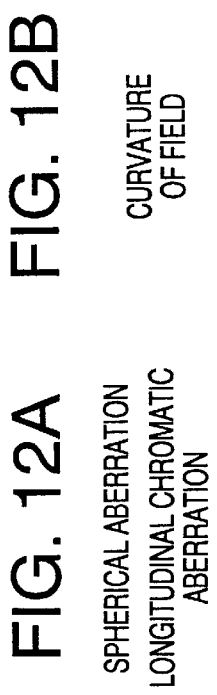 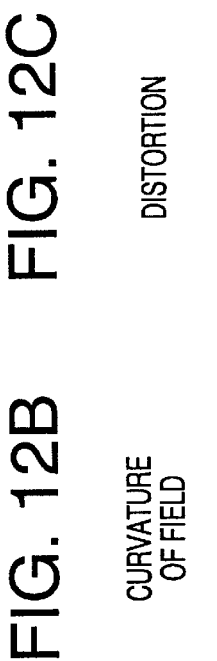  

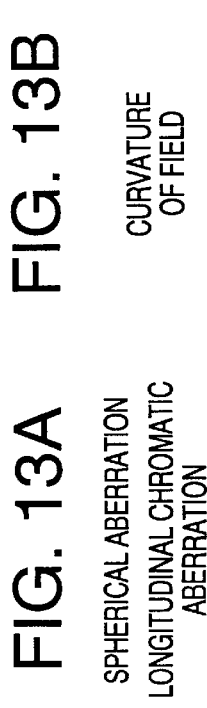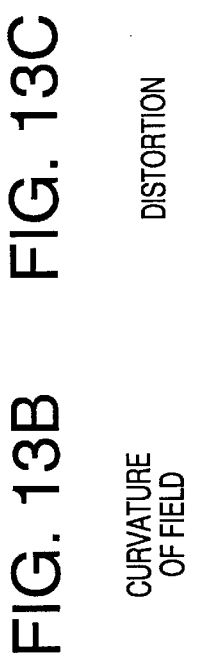

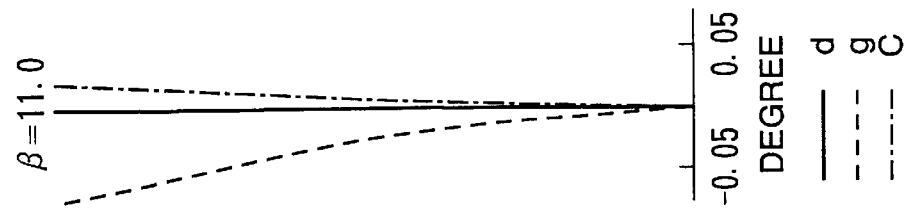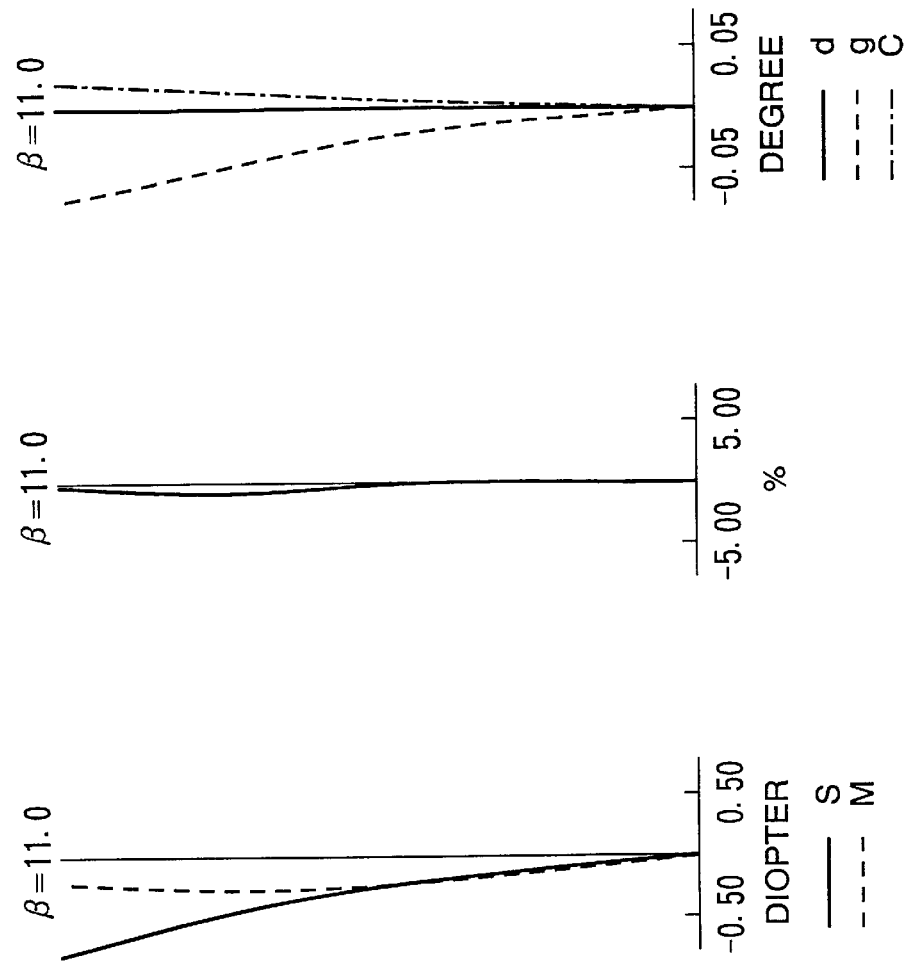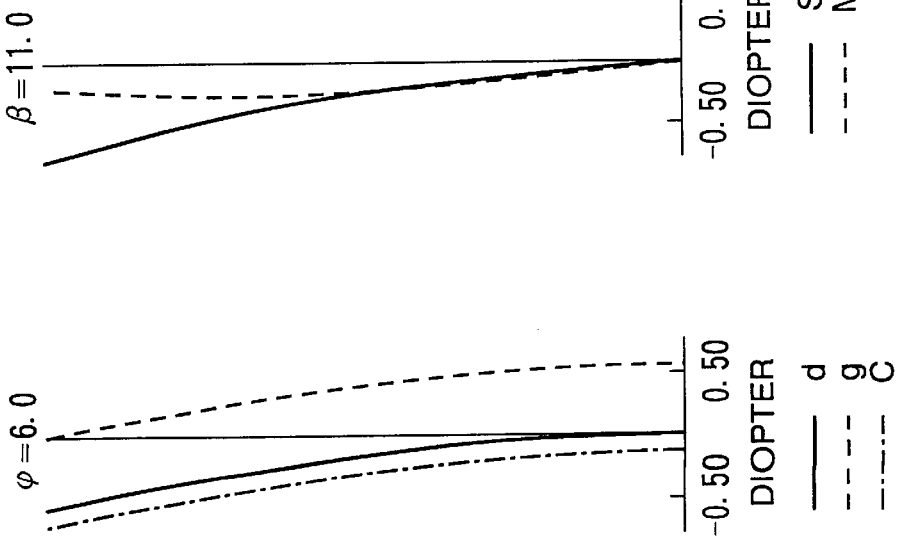

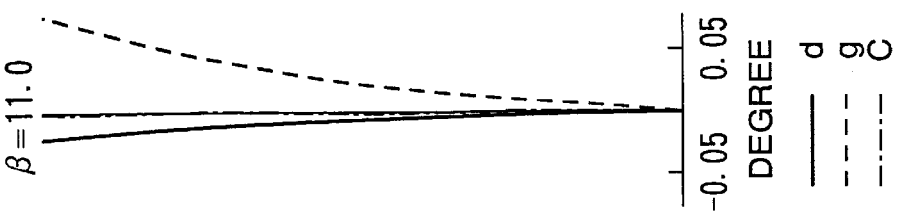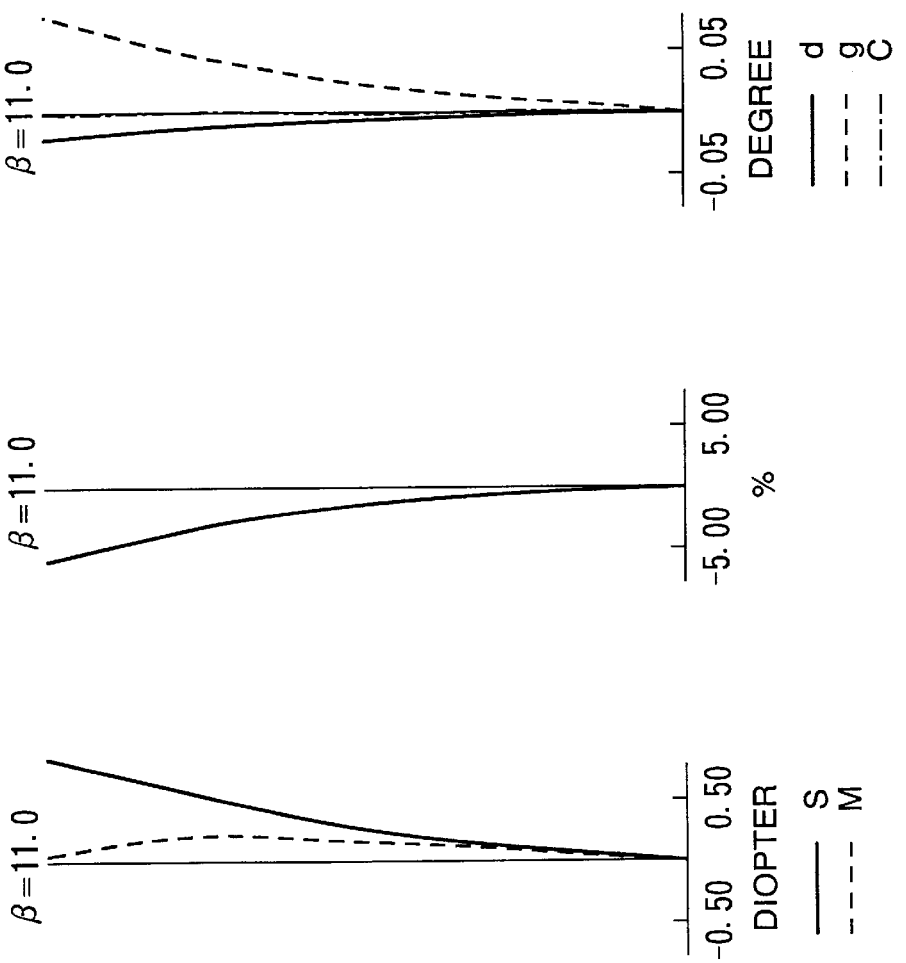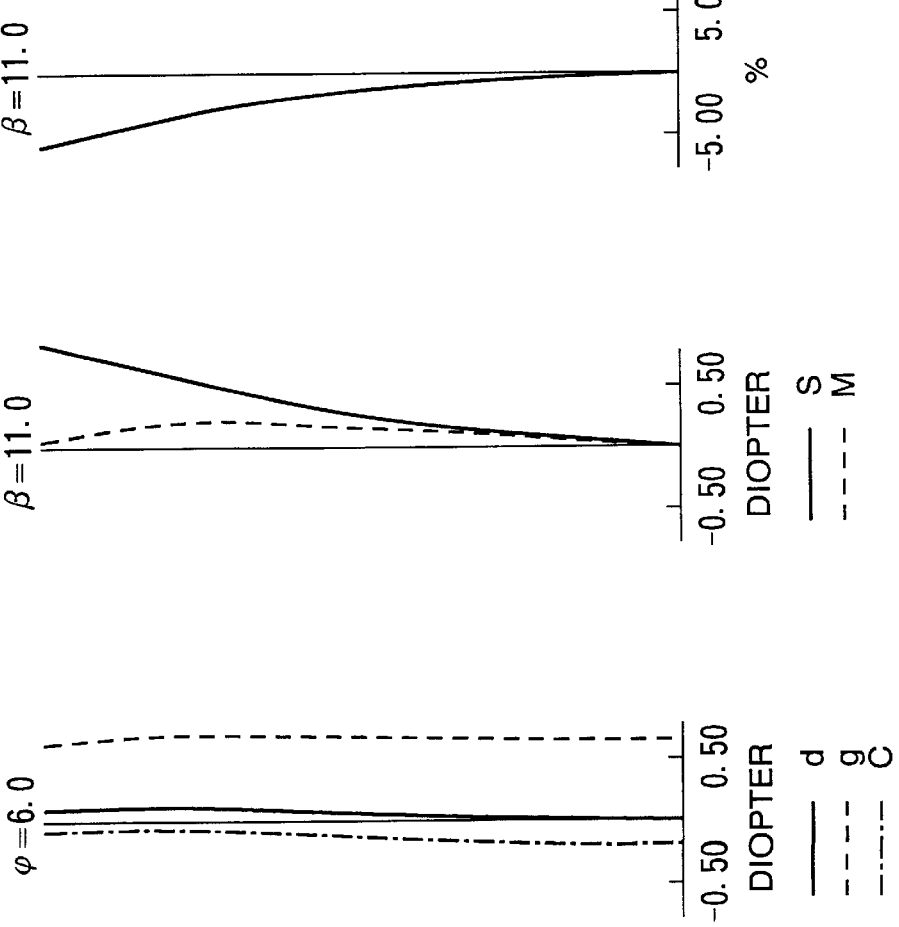
FIG. 15A  FIG. 15B  FIG. 15C  FIG. 15D

REAL IMAGE TYPE FINDER OPTICAL SYSTEM

BACKGROUND OF THE INVENTION

The present invention relates to a real image type finder optical system provided, in a camera, independently of a photographing optical system, and more specifically, to a real image type finder optical system which is capable of displaying information in the field of view thereof.

A real image type finder is known as one of the finders provided in a camera. The real image type finder may be provided independently of a photographing optical system. The real image type finder includes an objective optical system having a positive power, an erecting optical system for erecting a reversed image formed by the objective optical system, and an eyepiece optical system for observing the erected image in a magnified fashion. The above described optical systems are provided in this order from an object.

In general, the real image type finder is provided with an information displaying element in the vicinity of an image plane of the objective optical system to display information in the finder field. The displaying element is arranged such that an opaque pattern is formed on a portion of a transparent member to thereby shield light which is incident from an object so that a frame indicating a photographing range, a frame indicating a focusing zone, a photographing mode of the camera, and other alphanumeric information are displayed in the finder field. If the information is variable, a liquid crystal display element or the like may be used.

In the above-described conventional real image type finder, however, since the display element is disposed in the vicinity of the focusing surface of the objective optical system on which the eye of a viewer is focused, there is a problem that when foreign particles such as dust particles are adhered on the displaying element while it is assembled into the camera, the foreign particles may be made conspicuous in a field of view when observed through the eyepiece optical system. If the number of surfaces arranged in the vicinity of the image plane is reduced, the possibility that the foreign particles are made conspicuous in the field of view is reduced. For this purpose, there has been known an arrangement that the lens of the objective optical system is spaced from the vicinity of the image plane. However, since conventional finders are designed such that the patterns formed on a displaying element are directly observed through the eyepiece optical system, the displaying element cannot be positioned apart from the vicinity of the image plane for the clear observation of the patterns. Thus, there still remains a problem that the foreign particles are conspicuous in the field of view and prevent observation.

SUMMARY OF THE INVENTION

It is therefore an object of the present invention to provide an improved real image type finder optical system which prevents foreign particles from being made conspicuous in a field of view even if they are adhered on the elements, including a displaying element, constituting an objective optical system.

For the above object, according to the invention, there is provided a real image type finder optical system which is provided with an objective optical system having a positive power, an erecting optical system for erecting a reversed real image formed by the objective optical system, an eyepiece optical system for observing the real image formed by the objective optical system and erected by the erecting optical system, an information display element provided in the objective optical system, the information display element displaying information to be observed in a field of view of the finder optical system, and a partial mirror surface provided on an object side with respect to the information display element, the partial mirror allowing a part of light from the object to pass therethrough and reflecting light from the information display element towards the eyepiece optical system.

Optionally, the light emerged from the information display element and reflected by the partial mirror surface forms a real image of the information in the vicinity of an image plane on which the real image of the object is formed by the objective optical system.

Further optionally, surfaces of elements constituting the objective optical system and the erecting optical system are located apart from an image plane of the objective optical system.

Specifically, the partial mirror surface is formed on a surface of a lens included in the objective optical system, the surface being one of a convex surface on the object side surface of the lens and a concave surface on the eyepiece optical system side surface of the lens.

In particular, the information display element may be a transparent member, mirror finished reflection patterns being formed on a surface of the transparent member.

In this case, light incident from the object and reflected by the mirror finished reflection patterns is reflected by the partial mirror surface and form a real image in the vicinity of an image plane of the objective optical system.

Alternatively, the information display element may include an opaque member formed with a transparent pattern for causing light to pass therethrough, the transparent pattern being formed in accordance with a shape of information to be displayed, and a light source for emitting light towards the transparent pattern.

In this case, the light source may have a light intake window for introducing ambient light to illuminate the transparent pattern from the eyepiece objective system side to the object side.

Alternatively, the light source may have a light emitting element for emitting light to illuminate the transparent pattern from the eyepiece objective system side to the object side.

Still optionally, the light passed through the transparent pattern from the eyepiece optical system side to the object side is reflected by the partial mirror surface and forms a real image of the transparent pattern in the vicinity of an image plane of the objective optical system.

Furthermore, a magnification of the real image of information formed in the vicinity of the image plane of the objective optical system is within a range of:

$$-1 \leq M < O.$$

Yet optionally, the partial mirror surface may have a reflection portion that is formed only on an area, of the partial mirror surface, on which light from the information displaying element is incident.

According to another aspect of the invention, there is provided a real image type finder optical system, which includes: an objective optical system having a positive power, at least one lens included in the objective optical system being movable in a direction of an optical axis of the objective optical system to change magnification of the finder optical system; an erecting optical system for erecting a reversed real image formed by the objective optical system; an eyepiece optical system for observing the real image formed by the objective optical system and erected by the erecting optical system; an information display element provided in the objective optical system, the information display element displaying information to be observed in a field of view of the finder optical system; and a partial mirror surface provided on an object side with respect to the information display element, the partial mirror allowing a part of light from the object to pass therethrough and reflecting light from the information display element towards the eyepiece optical system.

Optionally, light passing from the information display element and reflected by the partial mirror surface forms a real image of the information in the vicinity of an image plane on which the real image of the object is formed by the objective optical system.

In this case, each surface of the objective optical system, the erecting optical system and the eyepiece optical system may be arranged apart from the image plane of the objective optical system. It is preferable that the real image type finder optical system satisfies a following condition:

$$0.28 < s/fe < 0.5,$$

where, s represents a distance in air between a surface of the information display element on which the information to be observed is formed and the image plane of the objective optical system, and fe represents a focal length of the eyepiece optical system.

According to a further aspect of the invention, there is provided a real image type finder optical system, which includes: an objective optical system that forms a real image of an object on an image plane; an information displaying optical system that forms a real image of patterns corresponding to information to be displayed in a vicinity of the image plane of the objective optical system; an erecting optical system that erects the real image formed in a vicinity of the image plane; and an eyepiece optical system that allows a viewer to observe the real image formed on the image plane and erected by the erecting optical system.

Optionally, the information displaying optical system is a part of the objective optical system.

Further optionally, the objective optical system includes a magnification changing optical system for changing magnification of the finder optical system, the magnification changing optical system and the information displaying optical system being distinct optical systems.

BRIEF DESCRIPTION OF THE ACCOMPANYING DRAWINGS

FIGS. 1A and 1B show an arrangement of optical elements of a real image type finder optical system according to a first embodiment, wherein FIG. 1A shows a path of light incident from an object and FIG. 1B shows a path of light reflected by reflection patterns;

FIGS. 6A and 6B show an arrangement of optical elements of a real image type finder optical system according to a fifth embodiment, wherein FIG. 6A shows a path of light incident from an object and FIG. 6B shows a path of light reflected by reflection patterns;

Figure 8:
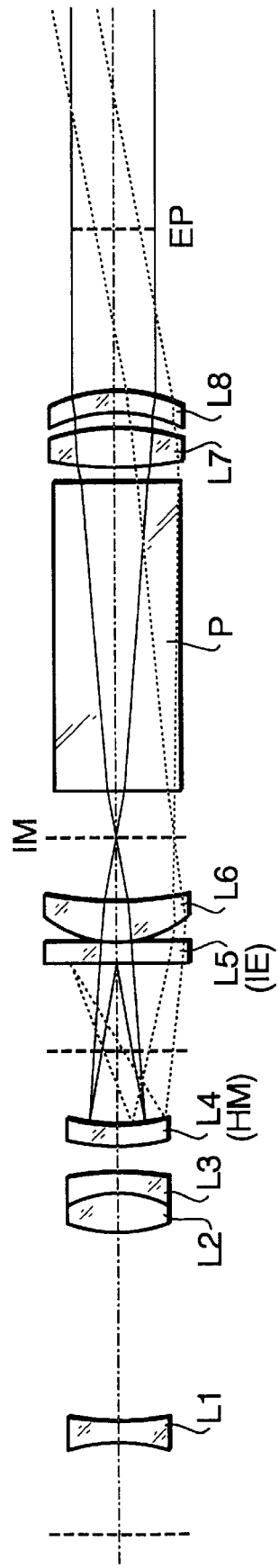

FIGS. 7A and 7B show an arrangement of optical elements of a real image type finder optical system to which a sixth, seven and eight embodiments are applicable, wherein FIG. 7A shows a path of light incident from an object when the optical elements are arranged in accordance with a wide extremity setting, and FIG. 7B shows a path of light when the optical elements are arranged in a tele extremity setting;

FIG. 8 shows an arrangement of the optical elements of the real image type finder optical system shown in FIGS. 7A and 7B, wherein FIG. 8 shows a path of light reflected by an information displaying element;

FIGS. 9A–9D are graphs showing aberrations of the finder optical system according to the sixth embodiment when the optical elements are arranged in the wide extremity setting;

FIGS. 10A–10D are graphs showing aberrations of the finder optical system according to the sixth embodiment when the optical elements are arranged in the tele extremity setting;

FIGS. 11A–11D are graphs showing aberrations of the information displaying optical system of the finder optical system according to the sixth embodiment;

FIGS. 12A–12D are graphs showing aberrations of the finder optical system according to the seventh embodiment when the optical elements are arranged in the wide extremity setting;

FIGS. 13A–13D are graphs showing aberrations of the finder optical system according to the seventh embodiment when the optical elements are arranged in the tele extremity setting;

FIGS. 14A–14D are graphs showing aberrations of the information displaying optical system of the finder optical system according to the seventh embodiment;

FIGS. 15A–15D are graphs showing aberrations of the finder optical system according to the eighth embodiment when the optical elements are arranged in the wide extremity setting;

FIGS. 16A–16D are graphs showing aberrations of the finder optical system according to the eighth embodiment when the optical elements are arranged in the tele extremity setting;

FIGS. 17A–17D are graphs showing aberrations of the information displaying optical system of the finder optical system according to the eighth embodiment;

DETAILED DESCRIPTION OF THE PREFERRED EMBODIMENTS

Embodiments of a real image type finder optical system according to first to eighth embodiments of the present invention will be described hereinafter.

FIG. 1 shows an arrangement of optical elements of a real image type finder optical system according to a first embodiment of the invention. The real image type finder optical system includes an objective optical system 100 having a positive power as a whole, an erecting optical system 200 for erecting a reversed image formed by the objective optical system 100, and an eyepiece optical system 300 for magnifying the erected image. The objective optical system 100, the erecting optical system 200, and the eyepiece optical system 300 are arranged in this order from an object side which is on the left-hand side in FIG. 1. The numerals 1–16 in FIG. 1A respectively indicate surfaces of the optical elements counted from the object side.

The objective optical system 100 includes a first biconcave lens L1, an information displaying element IE for displaying information in a field of view of observation, a second biconvex lens L2, a third negative meniscus lens L3 and a fourth biconvex lens (condenser lens) L4 which are arranged in this order from the object. IM denotes an image plane of the objective optical system 100.

The erecting optical system 200 includes a mirror (not shown) and a prism P such as a Dach prism. The mirror is disposed, although not shown, in the objective optical system 100, and the prism P is shown in a developed fashion.

The eyepiece optical system 300 includes a fifth biconvex lens L5 and a sixth negative meniscus lens L6. EP denotes an eye point of the finder optical system.

The information displaying element IE included in the objective optical system 100 is a transparent flat plate having mirror-finished reflection patterns formed on the object side. The reflection patterns include a pattern for showing the frame of a field of view for indicating a photographing range, a pattern for showing the frame of a focusing zone indicating the range of an object to be focused by an automatic focusing mechanism and the like. The reflection patterns are formed by evaporating metal which reflects light onto the transparent plate.

The concave surface (surface No. 2: the eyepiece optical system side surface) of the first lens L1 which is located on the object side with respect to the information displaying element IE is formed to be a partial mirror surface which partly reflects light incident thereon. Specifically, in the finder optical system shown in FIGS. 1A and 1B, the concave surface 2 is formed to be a half-mirror surface HM to which a half-mirror coat is applied onto the entire surface thereof. The half-mirror coat is formed of a metal film, which is evaporated, such that a part of light is allowed to pass therethrough and another part of light is reflected thereby.

Alternatively, if, in the objective optical system, there is a lens which has a convex surface on the object side thereof, on the object side with respect to the information displaying element IE, the convex surface may be used as the half-mirror surface.

The reflection patterns directly face the half-mirror surface in the finder optical system shown in FIGS. 1A and 1B. This structure is advantageous since it prevents drop of a reflection ratio and minimizes a ghost. However, the invention is not limited to such a structure, but another lens may be interposed between the information displaying element IE and the half mirror HM. If a lens is interposed between the information displaying element IE and the half mirror HM, aberrations of the optical system contributing to show the information in the finder field may be compensated with the lens interposed.

The light incident on the information displaying element IE, from the object through the first lens L1, at the portion other than the reflection patterns passes through the information displaying element IE, the second lens L2 to the fourth lens L4, and forms an image of the object on the image plane IM. The image is observed by a viewer through the prism P, the fifth lens L5 and the sixth lens L6 as shown in FIG. 1A.

The light incident on the reflection patterns of the information displaying element IE is reflected thereby, reflected by the half mirror surface HM (i.e., surface 2) of the first lens L1, and then passes through the information displaying element IE and forms a real image of the reflection patterns in the vicinity of the image plane IM, through the second lens L2 to the fourth lens L4. The image of the reflection patterns are also observed by the viewer through the prism P, and the fifth lens L5 and the sixth lens L6 as shown in FIG. 1B. Therefore, the viewer can observe superimposed images of the object and the reflection patterns in the finder field. Hereinafter, the half mirror surface HM, and the optical elements arranged on the eye side of the half mirror surface HM will be referred to as an image displaying optical system.

The elements of the objective optical system, including the information displaying element IE, and the prism P constituting the erecting optical system are spaced from the image plane IM of the objective optical system 100. Therefore, even if foreign particles such as dust particles is adhered on the surfaces thereof, the eye of the viewer does not focus on the foreign particles. Accordingly, the image of the foreign particles is not conspicuous in the field of view.

If the foreign particles are adhered on the surface of the information displaying element IE where the reflection patterns are formed, the light reflected by the foreign particles is reflected by the half mirror surface HM and forms an image in the vicinity of the image plane IM. In such a case, however, since the reflection ratio of the foreign particles is generally very low as compared with the reflection ratio of the mirror finished reflection patterns, the image of the foreign particles is inconspicuous in the field of view.

It should be noted that, instead of the information displaying element IE provided with a reflective patterns, an information displaying element provided with transparent patterns through which light incident from the eyepiece optical system side passes may be utilized.

Figure 2:
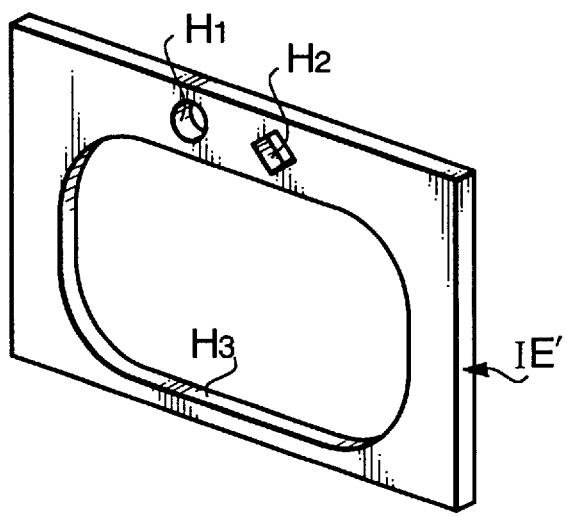
FIG. 2 is a perspective view of an information displaying element to be employed in a real image type finder optical system according to a second embodiment of the invention.

FIG. 2 shows a perspective view of an example of such an alternative, i.e., an information displaying element IE' which is employed in a finder optical system according to a second embodiment. In this example, the information displaying element IE' has two pattern holes H1 and H2 as the transparent patterns. A hole H3 formed at the center of the information displaying element IE' is a light passage hole which allows the light from the object and the light reflected by the half mirror surface HM to pass therethrough toward the eyepiece optical system 300.

Figure 3:
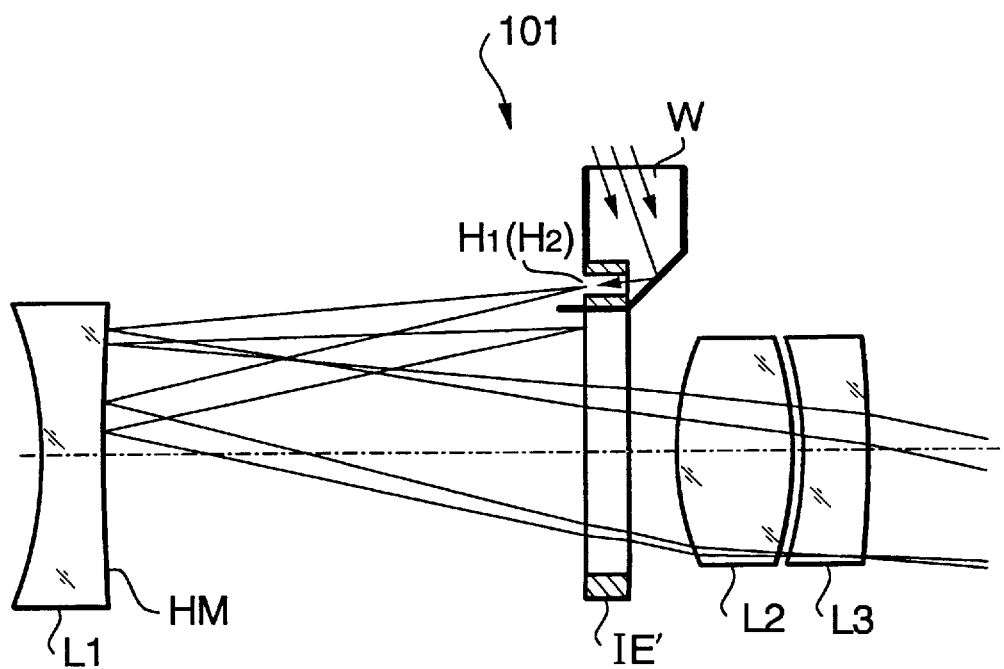
FIG. 3 is a structure of an information displaying optical system according to the second embodiment.

FIG. 3 shows an arrangement of the optical elements, including the information displaying element IE', of the objective optical system 101 according to the second embodiment. When the information displaying element IE' to which the transparent pattern is formed is provided, there is disposed a light intake window W for introducing light outside of the finder to be incident on the pattern holes H1 and H2 from the eyepiece optical system side as shown in FIG. 3.

Figure 4:
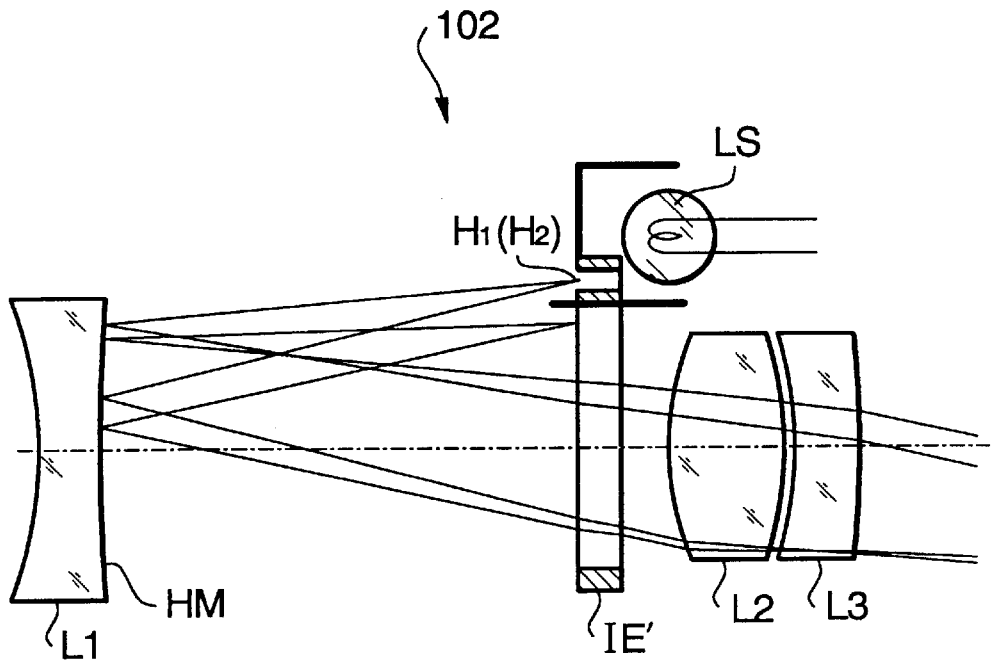
FIG. 4 shows a structure of an information displaying optical system according to a third embodiment.

FIG. 4 shows an objective optical system 102 according to the third embodiment which is a modification of the second embodiment. The second embodiment can be modified to include a light emitting member LS such as a bulb or the like for causing light to be incident, from the eyepiece optical system side, on the pattern hole H1 and H2. Selfluminous paint may be used as the light emitting member. In either of the second and third embodiments, the light passed through the pattern holes H1 and H2 of the information displaying element IE' is reflected by the half mirror surface HM of the first lens L1, passes through the hole H3, and forms the image of the pattern holes H1 and H2 in the vicinity of the image plane IM of the objective optical system 102.

Regardless whether the reflection pattern or the transparent pattern is used, it is preferable that the magnification M (i.e., a ratio of the image formed on the image plane IM to the pattern holes H1 and H2 of the information displaying element IE') of the optical system contributing to form the image of the pattern holes H1 and H2 satisfies the following condition:

$$-1 \leq M < 0 \tag{1}$$

When condition (1) is satisfied, the image of the foreign particles is inconspicuous in the finder field. That is, when the above condition is satisfied, the size of the image of the foreign particles adhered on the surface of the image displaying element IE or IE' can be made smaller than the actual size thereof. Accordingly, the foreign particles can be made inconspicuous in the field of view. Whereas, when the magnification M is out of the above range, i.e., M<−1, the foreign particles may be conspicuous. In this case, however, the size of the information displaying element can be reduced.

Figure 5:
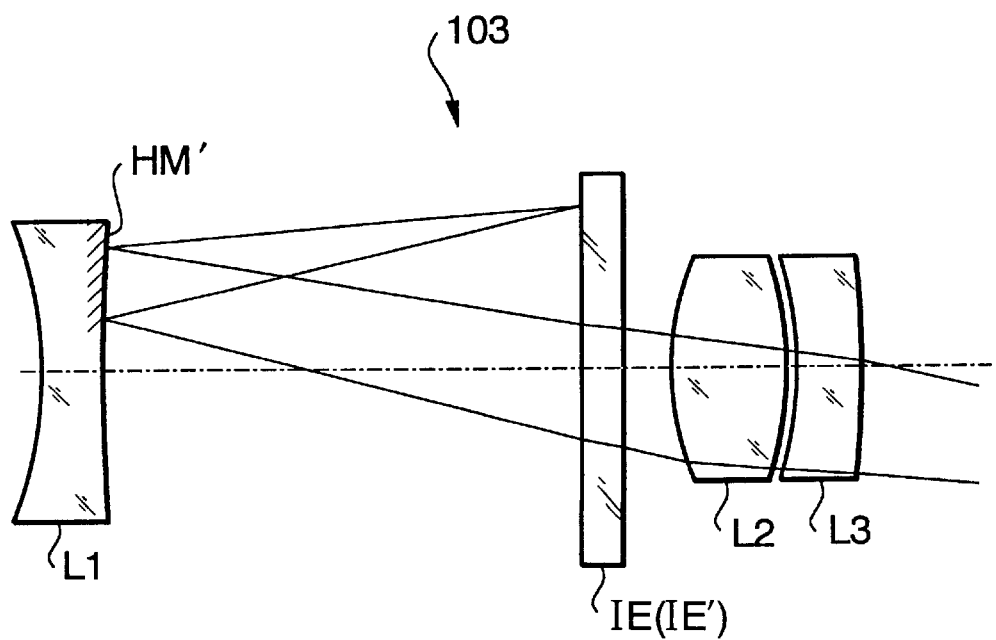
FIG. 5 shows a structure of an information displaying optical system according to a fourth embodiment.

FIG. 5 shows an objective optical system 103 according to a fourth embodiment which is a modification of the half mirror surface HM. Specifically, according to the fourth embodiment, the half mirror surface HM' may be formed on a part of the surface 2 of the first lens L1. That is, only a portion on which the light from the information displaying element IE is incident as shown by oblique lines in FIG. 5, is formed to be the half mirror surface.

Further alternatively, if the display patterns are formed on a relatively narrow area with respect to the entire field of view, or if the patterns are formed on a partial area, for example, on an outer periphery, the partial mirror surface may be formed as an ordinary mirror surface having a reflectance ratio of about 90%, in place of the half mirror surface, only on a portion necessary to reflect the light corresponding to the patterns. In this case, the image of the object will be formed by the light passed through an area of the lens where the mirror surface is not formed.

Two numerical examples of the real image type finder optical system according to the first embodiment and a sixth embodiment will be described below. In either of examples 1 and 2 described below, the half mirror surface HM is formed on surface 2 of the first lens L1, and the reflection patterns are formed on surface 3 of the information displaying element IE interposed between the first lens L1 and the second lens L2 as shown in FIGS. 1A and 1B.

EXAMPLE 1

Specific numerical arrangement is indicated in Table 1, which is to be applied to the structure shown in FIGS. 1A and 1B. In Table 1, d0 represents a distance from surface 1, which faces the object, of the first lens L1 to the object [unit: mm], ω represents an actual field of view (half an amount) [unit: degree], β represents an apparent field of view (half an amount) [unit: degree], γ represents a magnification of an entire finder optical system, M represents a magnification of the information displaying optical system, D1 represents diopter of the finder optical system [unit: Dptr], D2 represents diopter of the information displaying optical system [unit: Dptr], r represents a radius of curvature of the each lens [unit: mm], d represents a thickness of lenses or intervals between lenses [unit: mm], nd represents a refraction ratio of the respective lenses with respect to d-line (588 nm) and ν represents the Abbe's number of each lens.

In the first embodiment, surface 1 (the first lens L1), surface 5 (the second lens L2), surface 8 (the third lens L3), surface 10 (the fourth lens L4), and surface 13 (the fifth lens L5) are formed to be rationally-symmetrical aspherical surfaces. The aspherical surface will be expressed by the following formula (2) which represents a sag amount X(h) at a coordinate point on the aspherical surface whose height with respect to the optical axis is h. That is, a distance of the coordinate point on the aspherical surface from the tangential plane of the aspherical surface at a point where the optical axis intersects the aspherical surface is represented by X(h).

$$X(h) = ch^2/(1+(1-(1+K)c^2h^2)^{1/2}) + A4h^4 + A6h^6 \tag{2}$$

where, c represents the curvature (1/r) of the aspherical surface on the optical axis, K represents a conic coefficient, and A4 and A6 represent fourth-order and sixth-order aspherical surface coefficients, respectively.

The radius of curvature of the aspherical surface indicated in Table 1 is the radius on the optical axis. Table 2 indicates the conic coefficients and aspherical surface coefficients of the aspherical surfaces.

TABLE 1

| d0 = −2940.0 mm | ω = 26.3° | β = 11.0° | γ = 0.41 |
| M = −1.65 | D1 = −0.99 Dptr | D2 = −0.97 Dptr | |

| Surface No. | r | d | nd | ν |
|---|---|---|---|---|
| *1 | −11.45 | 1.50 | 1.49176 | 57.3 |
| 2 | 18.29 | 5.63 | | |
| 3 | ∞ | 1.50 | 1.49176 | 57.3 |
| 4 | ∞ | 7.90 | | |
| *5 | 8.10 | 2.80 | 1.4917 | 57.3 |
| 6 | −8.16 | 0.20 | | |
| 7 | −8.50 | 1.50 | 1.58547 | 29.8 |
| *8 | −30.35 | 16.70 | | |
| 9 | 12.17 | 2.00 | 1.49176 | 57.3 |
| *10 | −22.71 | 8.28 | | |
| 11 | ∞ | 21.70 | 1.49176 | 57.3 |
| 12 | ∞ | 1.20 | | |
| *13 | 25.85 | 2.60 | 1.49176 | 57.3 |
| 14 | −15.12 | 1.20 | | |
| 15 | −15.20 | 1.20 | 1.49176 | 57.3 |
| 16 | −17.51 | | | |

TABLE 2

| surface # | k | A4 | A6 |
|---|---|---|---|
| 1 | 0.000 | 2.904 × 10$^{-4}$ | −2.328 × 10$^{-6}$ |
| 5 | 0.000 | 1.736 × 10$^{-4}$ | −3.860 × 10$^{-6}$ |
| 8 | 0.000 | 5.957 × 10$^{-4}$ | 4.957 × 10$^{-6}$ |
| 10 | 0.000 | 5.894 × 10$^{-4}$ | −6.643 × 10$^{-6}$ |
| 13 | 0.000 | −7.794 × 10$^{-5}$ | 1.397 × 10$^{-7}$ |

EXAMPLE 2

FIG. 6 shows an arrangement of lenses according to a fifth embodiment, and numerical structure thereof is indicated in Table 3. The structure of the fifth embodiment is similar to that of the first embodiment, except that the fourth lens L4 of the fifth embodiment is a positive meniscus lens. In the fifth embodiment, surfaces 1, 5, 8, 10 and 13 are rotationally symmetrical aspherical surfaces. Table 4 shows the conic coefficients and aspherical surface coefficients of these surfaces.

TABLE 3

| d0 = −2940.0 mm | ω = 23.8° | β = 10.0° | γ = 0.41 |
| M = −0.80 | D1 = −1.00 Dptr | D2 = −1.07 Dptr | |

| Surface No. | r | d | nd | ν |
|---|---|---|---|---|
| *1 | −9.13 | 1.50 | 1.49176 | 57.3 |
| 2 | 72.57 | 11.62 | | |
| 3 | ∞ | 1.00 | 1.51633 | 64.1 |
| 4 | ∞ | 1.19 | | |
| *5 | 8.10 | 2.80 | 1.49176 | 57.3 |
| 6 | −8.16 | 0.20 | | |
| 7 | −8.57 | 1.50 | 1.58547 | 29.8 |
| *8 | −30.42 | 14.53 | | |
| 9 | 7.00 | 2.00 | 1.49176 | 57.3 |
| *10 | 38.77 | 8.28 | | |
| 11 | ∞ | 21.70 | 1.49176 | 53.7 |
| 12 | ∞ | 1.20 | | |
| *13 | 30.65 | 2.60 | 1.49176 | 57.3 |
| 14 | −14.20 | 1.20 | | |
| 15 | −15.32 | 1.20 | 1.49176 | 57.3 |
| 16 | −17.33 | | | |

TABLE 4

| surface # | k | A4 | A6 |
|---|---|---|---|
| 1 | 0.000 | $5.808 \times 10^{-4}$ | $-7.124 \times 10^{-6}$ |
| 5 | 0.000 | $-3.316 \times 10^{-5}$ | $-3.929 \times 10^{-6}$ |
| 8 | 0.000 | $3.640 \times 10^{-4}$ | $1.639 \times 10^{-6}$ |
| 10 | 0.000 | $7.990 \times 10^{-4}$ | $-5.038 \times 10^{-6}$ |
| 13 | 0.000 | $-8.826 \times 10^{-5}$ | $5.045 \times 10^{-7}$ |

As described above, since the elements constituting the objective optical system and the erecting optical system are arranged apart from the image plane of the objective optical system, foreign particles adhered on surfaces of the optical elements, including the information displaying element, can be made inconspicuous in the field of view. Further, even if foreign particles are adhered on the information displaying element, and the light reflected by the foreign particles forms the image thereof, there is a very small possibility that the image of the foreign particles is made conspicuous in the field of view of the finder, since the reflection ratio of the foreign particles is generally very low as compared with the reflection ratio of the mirror finished reflection patterns formed on the information displaying element.

FIGS. 7A and 7B show an arrangement of a real image type finder optical system according to a sixth embodiment of the invention. In the sixth embodiment, the finder optical system is a variable magnification finder optical system which is provided independently of a zoom lens (not shown), and the magnification thereof is changed in accordance with movement of the zoom lens by means of an interlocking mechanism (not shown). Similarly to the embodiments described above, the real image type finder optical system according to the sixth embodiment includes an objective optical system 100M having a positive power as a whole, an erecting optical system 200M for erecting a reversed image formed by the objective optical system 100M, and an eyepiece optical system 300M for magnifying the erected image. The objective optical system 100M, the erecting optical system 200M, and the eyepiece optical system 300M are arranged in this order from an object side which is on the left-hand side in FIG. 7A or 7B. Alphanumerical symbols r1–r21 in FIG. 7A respectively indicate surfaces of the optical elements or image plane counted from the object side. Alphanumerical symbols d1–d20 represent distances between surfaces r1–r21.

The objective optical system 100M includes a biconcave first lens L1, a biconvex second lens L2, a negative meniscus third lens L3, a negative meniscus fourth lens L4, an information displaying element IE" (which will be referred to as a fifth lens L5) for displaying information in a field of view of observation, a positive meniscus sixth lens L6 which are arranged in this order from the object. IM denotes an image plane of the objective optical system 100M.

The erecting optical system 200M includes a mirror (not shown) and a prism P such as a Dach prism. The mirror is disposed, although not shown, in the objective optical system 100M (a position thereof is indicated by a dotted line rf1), and the prism P is indicated in a developed fashion. r1 denotes a surface of a cover glass of the finder optical system.

The eyepiece optical system 300M includes a biconvex seventh lens L7 and a negative meniscus eighth lens L8. EP denotes an eye point of the finder optical system.

As shown in FIGS. 7A and 7B, the first lens L1 (which will be referred to as a first lens group), and the second and third lenses L2 and L3 (which will be referred to as a second lens group) are moved in accordance with change of focal length of the zoom lens. FIG. 7A shows a state when the zoom lens is positioned to a wide extremity, and FIG. 7B shows a state when the zoom lens is located at a tele extremity.

Similarly to the other embodiments, the information displaying element IE (the fifth lens L5) included in the objective optical system 100M is a transparent flat plate having mirror-finished reflection patterns formed on the object side. The reflection patterns include a pattern for showing the frame of a field of view for indicating a photographing range, a pattern for showing the frame of a focusing zone indicating the range of an object to be focused by an automatic focusing mechanism and the like. The reflection patterns are formed of vapor deposited metal film or coating which reflects light onto the transparent plate. In examples 3 and 4 described later, the information displaying element IE is a parallel plate having no refractive power. In example 5, the information displaying element IE is a lens having a negative power.

In this embodiment, the concave surface (surface r9: the eyepiece optical system side surface) of the fourth lens L4 which is located on the object side with respect to the information displaying element IE is formed to be the partial mirror surface which partly reflects light incident thereon. Specifically, in the finder optical system shown in FIGS. 7A and 7B, the concave surface r9 is formed to be a half-mirror surface HM to which a half-mirror coat is applied onto the entire surface thereof. The half-mirror coat is formed of a vapor deposited metal film or coating such that a part of light is allowed to pass therethrough and another part of light is reflected thereby.

Alternatively, if, in the objective optical system, there is a lens which has a convex surface on the object side thereof, e.g., surface r8 of the fourth lens L4, on the object side with respect to the information displaying element IE, the convex surface may be used as the half-mirror surface.

In this embodiment, the reflection patterns directly face the half-mirror surface HM in FIGS. 7A and 7B. However, the invention is not limited to such a structure, but another lens may be interposed between the information displaying element IE and the half mirror HM as mentioned when the first embodiment was described.

The light incident on the information displaying element IE (the fifth lens L5), from the object through the first to fourth lenses L1–L4, at the portion other than the reflection patterns passes through the information displaying element IE, the sixth lens L6, and forms an image of the object on the image plane IM (plane r14). The image is observed by a viewer through the prism P, the seventh lens L7 and the eighth lens L8.

The light incident on the reflection patterns of the information displaying element IE is reflected thereby (surface r10), reflected by the half mirror surface HM (i.e., surface r9) of the fourth lens L4, and then passes through the information displaying element IE (i.e., the fifth lens L5) and forms a real image of the reflection patterns in the vicinity of the image plane IM, through the sixth lens L6. Thus, the image of the reflection patterns are also observed by the viewer through the prism P, and the seventh lens L7 and the eighth lens L8 as shown in FIG. 8. Therefore, the viewer can observe superimposed images of the object and the reflection patterns in the finder field. In this configuration, the image displaying optical system is defined as an optical system from surface r9 to surface r20.

The elements of the objective optical system 100M, including the information displaying element IE, and the prism P constituting the erecting optical system are spaced from the image plane IM of the objective optical system 100M. Therefore, as described above, even if foreign particles such as dust particles are adhered on the surfaces thereof, the eye of the viewer does not focus on the foreign particles. Accordingly, the image of the foreign particles is not conspicuous in the field of view.

If the foreign particles are adhered on the surface of the information displaying element IE where the reflection patterns are formed, the light reflected by the foreign particles is reflected by the half mirror surface HM and forms an image in the vicinity of the image plane IM. In such a case, however, since the reflection ratio of the foreign particles is generally very low as compared with the reflection ratio of the mirror finished reflection patterns, the image of the foreign particles is inconspicuous in the field of view.

As described above, in this embodiment, the first lens group (the first lens L1), and the second lens group (the second and the third lenses L2 and L3) are moved along the optical axis to change the magnification of the finder optical system. It should be noted that the half mirror surface HM is formed on a surface of the fourth lens L4 which is not moved for changing magnification. Therefore, even if the magnification is changed, the information (i.e., the reflection patterns) can be observed without being affected by the change of the magnification. Further, since the half mirror surface HM is formed on the fourth lens L4 which is located on the eyepiece lens side of the first and second lens groups, and out of the movable range of the first and second lens groups, the half mirror surface HM does not interfere with the movement of the first and second lens groups.

It should be noted that the half mirror surface HM is formed to be an aspherical surface so that spherical aberration, distortion, curvature of field of the information displaying optical system (from surface r9 to surface r20) can be compensated.

By forming a reflection film having an average reflection ratio of 30%–60% with respect to visible light of a predetermined wavelength range (e.g., 550 nm=600 nm), both the object image and the image of the reflection patterns are easily observable. If the reflection ratio is lower than the lower limit (i.e., 30%), the information (i.e., the reflection patterns) may be difficult to be observed, and if the reflection ratio is greater than the upper limit (i.e., 60%), the object image may be difficult to be observed.

When the half mirror surface HM is formed as described above, it is preferable to form a reflection prevention film on the opposite surface (i.e., surface r8) with respect to visible light having wavelengths out of the above wavelength range. If such a film is formed, the light reflected by the information displaying element IE, incident on the half mirror surface HM, and passed through the half mirror surface HM is allowed to pass through surface r8. Accordingly, a ghost which may formed by the light passed through the half mirror surface HM and reflected by surface r8 may be prevented.

Alternatively, by forming a reflection film having an average reflection ratio of 20%–50% with respect to substantially entire wavelength range corresponding to the visible light, both the object image and the image of the reflection patterns can be observed easily. Also in this case, if the reflection ratio is lower than the lower limit (i.e., 20%), the information (i.e., the reflection patterns) may be difficult to be observed, and if the reflection ratio is greater than the upper limit (i.e., 50%), the object image may be difficult to be observed.

When the half mirror surface HM is formed as described above, it is preferable to form a reflection prevention film on the opposite surface (i.e., surface r8) with respect to entire wavelength range corresponding to the visible light.

Hereinafter, three numerical examples (examples 3, 4 and 5) applicable to the structure shown in FIGS. 7A and 7B will be described.

EXAMPLE 3

Specific numerical arrangement of example 3 is indicated in Table 5, which is to be applied to the structure shown in FIGS. 7A and 7B. In Table 5, d0 represents a distance from surface 1, which faces the object, of the first lens L1 to the object [unit: mm], ω represents an actual field of view (half an amount) [unit: degree], β represents an apparent field of view (half an amount) [unit: degree], γ represents a magnification of an entire finder optical system, M represents a magnification of the information displaying optical system, D1 represents diopter of the finder optical system [unit: Dptr], D2 represents diopter of the information displaying optical system [unit: Dptr], r represents a radius of curvature of the each lens [unit: mm], d represents a thickness of lenses or intervals between lenses [unit: mm], nd represents a refraction ratio of the respective lenses with respect to d-line (588 nm) and vd represents the Abbe's number of each lens. Further, values corresponding to wide extremity (wide), tele extremity (tele), and values of the information displaying optical system (ref) are indicated.

In the example 3, surface r2 (the first lens L1), surface r4 (the second lens L2), surface r7 (the third lens L3), surfaces r8 and r9 (the fourth lens L4), surfaces r12 and r13 (the sixth lens L6), and surface r17 (the seventh lens L7) are formed to be rationally-symmetrical aspherical surfaces. The aspherical surface is expressed by formula (2) described above.

The radius of curvature of the aspherical surface indicated in Table 5 is the radius on the optical axis. Table 6 indicates the conic coefficients and aspherical surface coefficients of the aspherical surfaces.

TABLE 5

| | wide | tele | ref |
|---|---|---|---|
| d0 | −2939.751 | −2939.751 | |
| ω | 25.7 | 12.9 | |
| β | 11.0 | 11.0 | 11.0 |
| γ | 0.43 | 0.8 | |
| M | | | −1.18 |
| Dptr | −1.0 | −1.0 | −1.0 |

| surface | r | d(wide) | d(tele) | nd | νd |
|---|---|---|---|---|---|
| r1 | ∞ | 5.78 | 0.0 | | |
| *r2 | −10.85 | 1.50 | | 1.49176 | 57.3 |
| r3 | 20.60 | 13.95 | 7.07 | | |
| *r4 | 8.82 | 2.80 | | 1.49176 | 57.3 |
| r5 | −8.91 | 0.20 | | | |
| r6 | −8.59 | 1.50 | | 1.58547 | 29.8 |
| *r7 | −21.52 | 2.01 | 14.67 | | |
| *r8 | 18.27 | 1.00 | | 1.49176 | 57.3 |
| *r9 | 16.93 | 13.05 | | | |
| r10 | ∞ | 1.00 | | 1.51633 | 64.1 |
| r11 | ∞ | 0.10 | | | |
| *r12 | 8.91 | 2.50 | | 1.49176 | 57.3 |
| *r13 | 433.14 | 4.91 | | | |
| r14 | ∞ | 3.50 | | | |
| r15 | ∞ | 22.96 | | 1.52580 | 52.1 |
| r16 | ∞ | 1.20 | | | |
| *r17 | 20.12 | 2.60 | | 1.49176 | 57.3 |
| r18 | −20.70 | 1.20 | | | |
| r19 | −15.31 | 1.20 | | 1.49176 | 57.3 |
| r20 | −15.61 | 12.00 | | | |
| r21 | ∞ | −997.53 | −997.53 | | |

TABLE 6

| surface | K | A4 | A6 |
|---|---|---|---|
| r2 | 0.0 | $4.090 \times 10^{-04}$ | $-2.237 \times 10^{-06}$ |
| r4 | 0.0 | $1.468 \times 10^{-05}$ | $8.006 \times 10^{-06}$ |
| r7 | 0.0 | $3.205 \times 10^{-04}$ | $1.139 \times 10^{-05}$ |
| r8 | 0.0 | $-2.336 \times 10^{-06}$ | $6.876 \times 10^{-07}$ |
| r9 | 0.0 | $-2.816 \times 10^{-05}$ | $0.000 \times 10^{+00}$ |
| r12 | 0.0 | $-5.082 \times 10^{-05}$ | $-3.095 \times 10^{-06}$ |
| r13 | 0.0 | $1.760 \times 10^{-04}$ | $0.000 \times 10^{+00}$ |
| r17 | 0.0 | $-7.354 \times 10^{-05}$ | $-9.909 \times 10^{-08}$ |

FIG. 9A shows a graph indicating spherical aberration/longitudinal chromatic aberration for d line, g line and C line [unit: diopter] when an exit pupil diameter φ=6.0 mm; FIG. 9B shows a graph indicating curvature of field in sagittal and meridional sections [unit: diopter]; FIG. 9C shows a graph indicating distortion [unit: %], and FIG. 9D shows a graph indicating lateral chromatic aberration for d line, g line and c line, respectively at the eye point EP when the objective optical system is in the wide state (see FIG. 7A).

FIG. 10A shows a graph indicating spherical aberration/longitudinal chromatic aberration for d line, g line and C line [unit: diopter] when an exit pupil diameter φ=5.0 mm; FIG. 10B shows a graph indicating curvature of field in sagittal and meridional sections [unit: diopter]; FIG. 10C shows a graph indicating distortion [unit: %], and FIG. 10D shows a graph indicating lateral chromatic aberration for d line, g line and c line, respectively at the eye point EP when the objective optical system is in the tele state (see FIG. 7B).

Figures 11A, 11B, 11C, 11D:
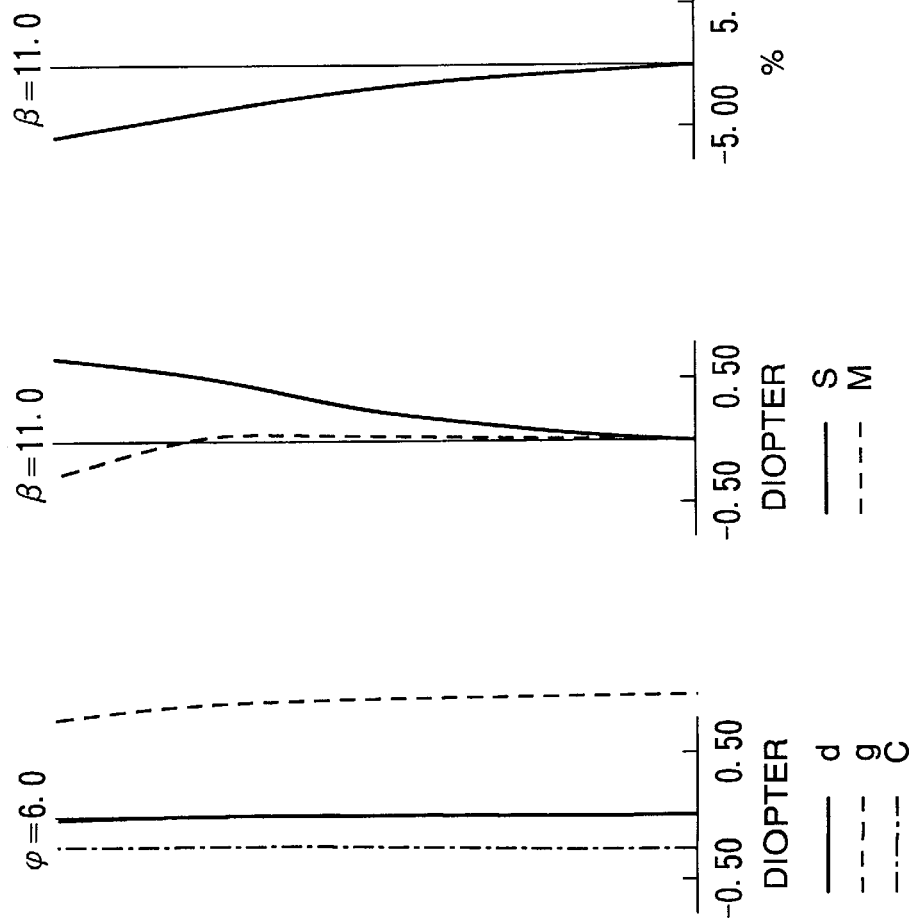
Figure 16A:
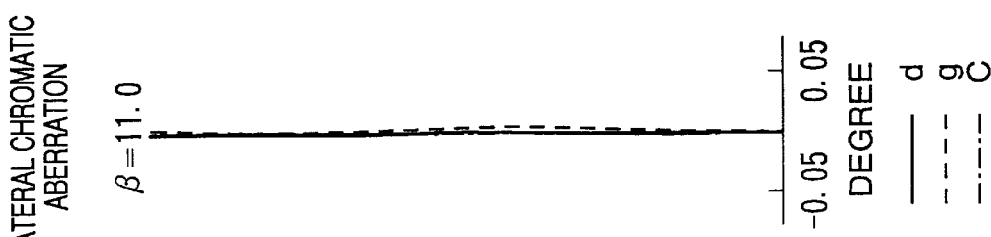
Figure 16B:
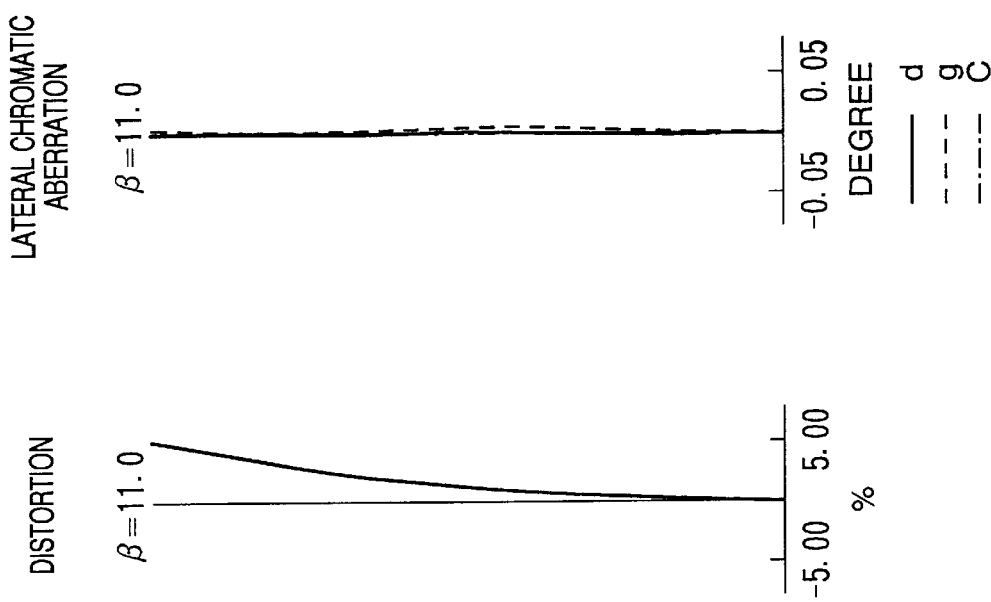
Figure 16C:
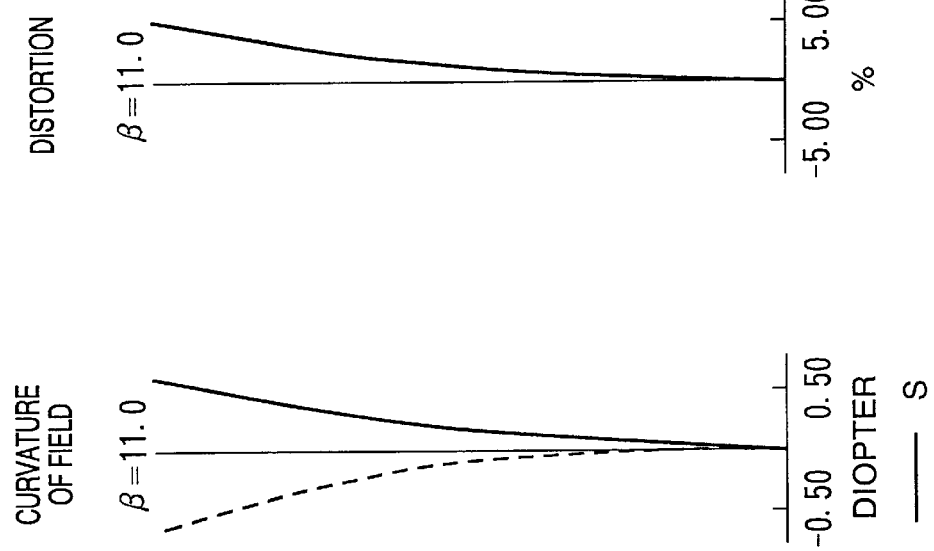
Figure 16D:
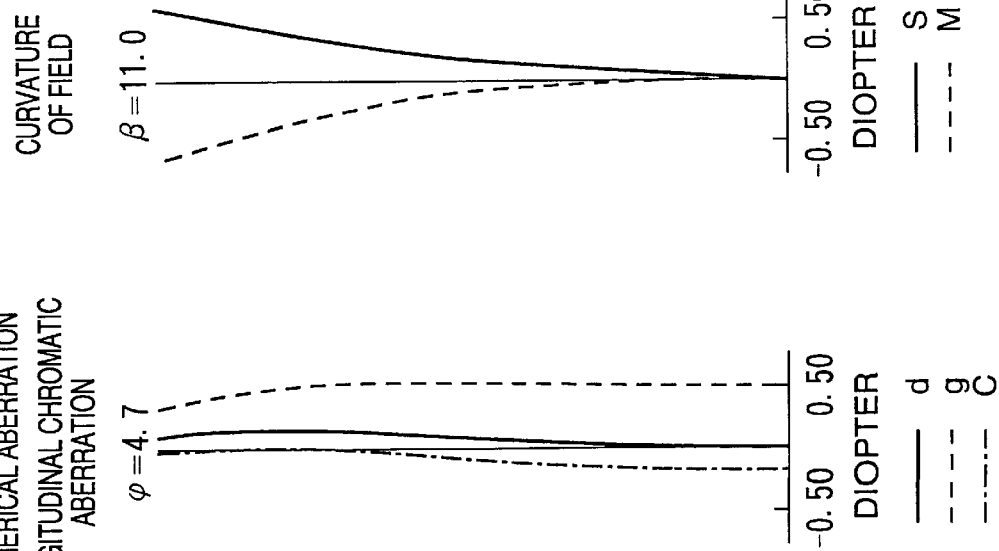
Figures 17A, 17B, 17C, 17D:
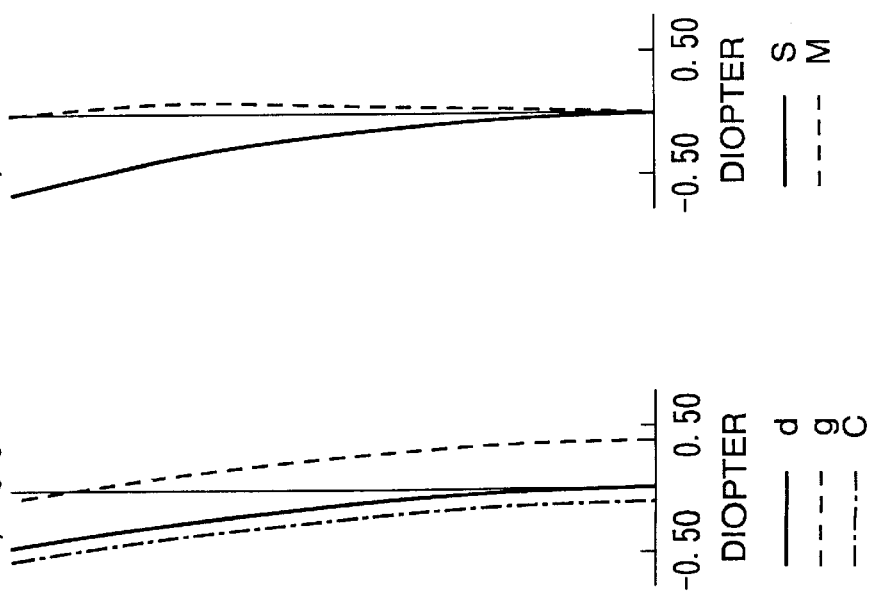

FIG. 11A shows a graph indicating spherical aberration/longitudinal chromatic aberration for d line, g line and c line [unit: diopter] when an exit pupil diameter ν=6.0 mm; FIG. 11B shows a graph indicating curvature of field in sagittal and meridional sections [unit: diopter]; FIG. 11C shows a graph indicating distortion [unit: %], and FIG. 11D shows a graph indicating lateral chromatic aberration for d line, g line and c line, respectively at the eye point EP, of the information displaying optical system (see FIG. 8).

EXAMPLE 4

In the example 4, surfaces r2 (the first lens Li), surface r4 (the second lens L2), surfaces r7 and r8 (the third lens L3), surface r9 (the fourth lens L4), surfaces r12 and r13 (the sixth lens L6), and surface r17 (the seventh lens L7) are formed to be rationally-symmetrical aspherical surfaces.

The radius of curvature of the aspherical surface indicated in Table 7 is the radius on the optical axis. Table 8 indicates the conic coefficients and aspherical surface coefficients of the aspherical surfaces.

TABLE 7

| | wide | tele | ref |
|---|---|---|---|
| d0 | −2938.5 | −2938.5 | |
| ω | 25.7 | 13.2 | |
| β | 11.0 | 11.0 | 11.0 |
| γ | 0.43 | 0.78 | |
| M | | | −1.25 |
| Dptr | −1.0 | −1.0 | −1.0 |

| surface | r | d(wide) | d(tele) | nd | νd |
|---|---|---|---|---|---|
| r1 | ∞ | 7.00 | 1.62 | | |
| *r2 | −11.94 | 1.50 | | 1.49176 | 57.3 |
| *r3 | 22.30 | 13.67 | 6.69 | | |
| *r4 | 10.94 | 2.80 | | 1.49176 | 57.3 |
| r5 | −7.23 | 0.19 | | | |
| r6 | −6.92 | 1.50 | | 1.58547 | 29.8 |
| *r7 | −15.08 | 2.01 | 14.36 | | |
| r8 | 17.01 | 1.50 | | 1.49176 | 57.3 |
| *r9 | 16.21 | 12.15 | | | |
| r10 | ∞ | 1.50 | | 1.49176 | 57.3 |
| r11 | ∞ | 0.10 | | | |
| r12 | 8.15 | 3.00 | | 1.49176 | 57.3 |
| *r13 | 55.38 | 4.84 | | | |
| r14 | ∞ | 3.50 | | | |
| r15 | ∞ | 22.96 | | 1.52580 | 52.1 |
| r16 | ∞ | 1.20 | | | |
| *r17 | 22.54 | 3.00 | | 1.49176 | 57.3 |
| r18 | −13.50 | 1.20 | | | |
| r19 | −10.76 | 1.50 | | 1.58547 | 29.8 |
| r20 | −13.86 | 12.00 | | | |
| r21 | ∞ | −992.23 | −992.23 | | |

TABLE 8

| surface | K | A4 | A6 |
|---|---|---|---|
| r2 | 0.0 | $1.967 \times 10^{-04}$ | $0.000 \times 10^{+00}$ |
| r3 | 0.0 | $-1.138 \times 10^{-04}$ | $0.000 \times 10^{+00}$ |
| r4 | 0.0 | $1.880 \times 10^{-05}$ | $0.000 \times 10^{+00}$ |
| r7 | 0.0 | $1.926 \times 10^{-04}$ | $0.000 \times 10^{+00}$ |
| r9 | 0.0 | $-5.420 \times 10^{-05}$ | $5.996 \times 10^{-07}$ |
| r13 | 0.0 | $4.626 \times 10^{-04}$ | $0.000 \times 10^{+00}$ |
| r17 | 0.0 | $-4.178 \times 10^{-05}$ | $0.000 \times 10^{+00}$ |

FIG. 12A shows a graph indicating spherical aberration/longitudinal chromatic aberration when an exit pupil diameter φ=6.0 mm; FIG. 12B shows a graph indicating curvature of field; FIG. 12C shows a graph indicating distortion, and FIG. 12D shows a graph indicating lateral chromatic aberration, respectively at the eye point EP when the objective optical system is in the wide state (see FIG. 7A).

FIGS. 13A–13D show graphs respectively indicating spherical aberration/longitudinal chromatic aberration when an exit pupil diameter φ=5.7 mm, curvature of field, distortion, and lateral chromatic aberration at the eye point EP when the objective optical system is in the tele state (see FIG. 7B).

FIGS. 14A–14D show graphs respectively indicating spherical aberration/longitudinal chromatic aberration when an exit pupil diameter φ=6.0 mm, curvature of field, distortion, and lateral chromatic aberration of the information displaying optical system at the eye point EP (see FIG. 8).

EXAMPLE 5

In the example 5, surfaces r2 and r3 (the first lens L1), surface r4 (the second lens L2), surface r7 (the third lens L3), surfaces r9 (the fourth lens L4), surface r13 (the sixth lens L6), and surface r17 (the seventh lens L7) are formed to be rationally-symmetrical aspherical surfaces.

The radius of curvature of the aspherical surface indicated in Table 9 is the radius on the optical axis. Table 10 indicates the conic coefficients and aspherical surface coefficients of the aspherical surfaces.

TABLE 9

|  | wide | tele | ref |
|---|---|---|---|
| d0 | −2938.5 | −2938.5 |  |
| ω | 26.1 | 13.3 |  |
| β | 11.0 | 11.0 | 11.0 |
| γ | 0.42 | 0.78 |  |
| M |  |  | −1.32 |
| Dptr | −1.0 | −1.0 | −1.0 |

| surface | r | d(wide) | d(tele) | nd | vd |
|---|---|---|---|---|---|
| r1 | ∞ | 7.00 | 1.79 |  |  |
| *r2 | −15.11 | 1.50 |  | 1.49176 | 57.3 |
| *r3 | 12.47 | 13.63 | 6.91 |  |  |
| *r4 | 10.90 | 2.80 |  | 1.49176 | 57.3 |
| r5 | −7.16 | 0.20 |  |  |  |
| r6 | −6.81 | 1.50 |  | 1.58547 | 29.8 |
| *r7 | −13.05 | 2.01 | 13.94 |  |  |
| r8 | 17.73 | 1.50 |  | 1.49176 | 57.3 |
| *r9 | 15.65 | 11.70 |  |  |  |
| r10 | ∞ | 1.50 |  | 1.58547 | 29.8 |
| r11 | 26.03 | 0.10 |  |  |  |
| r12 | 7.64 | 2.86 |  | 1.49176 | 57.3 |
| *r13 | −55.77 | 5.31 |  |  |  |
| r14 | ∞ | 3.50 |  |  |  |
| r15 | ∞ | 22.96 |  | 1.52580 | 52.1 |
| r16 | ∞ | 1.20 |  |  |  |
| *r17 | 19.77 | 3.20 |  | 1.49176 | 57.3 |
| r18 | −12.43 | 1.20 |  |  |  |
| r19 | −10.65 | 1.50 |  | 1.58547 | 29.8 |
| r20 | −15.80 | 12.00 |  |  |  |
| r21 | ∞ | −992.10 | −992.10 |  |  |

TABLE 10

| surface | K | A4 | A6 |
|---|---|---|---|
| r2 | 0.0 | 3.658 × 10$^{-05}$ | 0.000 × 10$^{+00}$ |
| r3 | 0.0 | −3.416 × 10$^{-04}$ | 0.000 × 10$^{+00}$ |
| r4 | 0.0 | −8.847 × 10$^{-05}$ | 0.000 × 10$^{+00}$ |
| r7 | 0.0 | 1.070 × 10$^{-04}$ | 0.000 × 10$^{+00}$ |
| r9 | 0.0 | −4.143 × 10$^{-05}$ | 3.100 × 10$^{-07}$ |
| r13 | 0.0 | 6.064 × 10$^{-04}$ | 0.000 × 10$^{+00}$ |
| r17 | 0.0 | −5.174 × 10$^{-05}$ | 0.000 × 10$^{+00}$ |

FIGS. 15A–15D show graphs respectively indicating spherical aberration/longitudinal chromatic aberration when an exit pupil diameter φ=6.0 mm, curvature of field, distortion, and lateral chromatic aberration at the eye point EP when the objective optical system is in the wide state (see FIG. 7A).

FIGS. 16A–16D show graphs respectively indicating spherical aberration/longitudinal chromatic aberration when an exit pupil diameter φ=4.7 mm, curvature of field, distortion, and lateral chromatic aberration at the eye point EP when the objective optical system is in the tele state (see FIG. 7B).

FIGS. 17A–17D show graphs respectively indicating spherical aberration/longitudinal chromatic aberration when an exit pupil diameter φ=6.0 mm, curvature of field, distortion, and lateral chromatic aberration of the information displaying optical system at the eye point EP (see FIG. 8).

It should be noted that if the information display element IE is too close to the image plane of the objective optical system, the reflection pattern formed on the information display element IE may be directly observed through the eyepiece optical system 300M. To avoid this problem, each surface of the objective optical system, erecting optical system and eyepiece optical system should be arranged sufficiently apart from the image plane of the objective optical system. In particular, it is preferable that the following condition is satisfied:

$$0.28 < s/fe < 0.5,$$

wherein, s represents a distance in air between a surface of the information display element IE on which the reflection pattern is formed and the image plane of the objective optical system, and fe represents a focal length of the eyepiece optical system. If s/fe is less than the lower limit of the condition, the information display element IE is too close to the image plane, and is directly observed, without being reflected by the half mirror surface HM, through the eyepiece optical system. While, if s/fe is greater than the upper limit, the finder optical system becomes large in size. Table 11 shows values of s/fe for examples 3–5.

TABLE 11

| example # | s/fe |
|---|---|
| 3 | 0.34 |
| 4 | 0.36 |
| 5 | 0.38 |

As indicated in Table 11, the examples 3–5 satisfy the condition above.

The present disclosure relates to a subject matter contained in Japanese Patent Application No. HEI 09-211368, filed on Jul. 22, 1997, which is expressly incorporated herein by reference in its entirety.

What is claimed is:

1. A real image type finder optical system, comprising:
   an objective optical system having a positive power;
   an erecting optical system for erecting a reversed real image formed by the objective optical system;
   an eyepiece optical system for observing said real image formed by said objective optical system and erected by said erecting optical system;
   an information display element provided in said objective optical system, said information display element displaying information to be observed in a field of view of said finder optical system; and
   a partial mirror surface provided on an object side with respect to said information display element, said partial mirror allowing a part of light from said object to pass therethrough and reflecting light from said information display element towards said eyepiece optical system.

2. The real image type finder optical system according to claim 1, wherein light passing from said information display element and reflected by said partial mirror surface forms a real image of said information in the vicinity of an image plane on which said real image of said object is formed by said objective optical system.

3. The real image type finder optical system according to claim 1, wherein surfaces of elements constituting said objective optical system and the erecting optical system are located apart from an image plane of said objective optical system.

4. The real image type finder optical system according to claim 1, wherein said partial mirror surface is formed on a surface of a lens included in said objective optical system, said surface being one of a convex surface on the object side surface of said lens and a concave surface on the eyepiece optical system side surface of said lens.

5. The real image type finder optical system according to claim 1, wherein said information display element is a transparent member, mirror finished reflection patterns being formed on a surface of said transparent member.

6. The real image type finder optical system according to claim 5, wherein light incident from said object and reflected by said mirror finished reflection patterns is reflected by said partial mirror surface and forms a real image in the vicinity of an image plane of said objective optical system.

7. The real image type finder optical system according to claim 1, wherein said information display element comprises:
an opaque member formed with a transparent pattern for causing light to pass therethrough, said transparent pattern being formed in accordance with a shape of information to be displayed; and
a light source for emitting light towards said transparent pattern.

8. The real image type finder optical system according to claim 7, wherein said light source has a light intake window for introducing ambient light to illuminate said transparent pattern from the eyepiece objective system side to the object side.

9. The real image type finder optical system according to claim 7, wherein said light source comprises a light emitting element for emitting light to illuminate said transparent pattern from the eyepiece objective system side to the object side.

10. The real image type finder optical system according to claim 7, wherein said light passed through said transparent pattern from the eyepiece optical system side to the object side is reflected by said partial mirror surface and forms a real image of said transparent pattern in the vicinity of an image plane of said objective optical system.

11. The real image type finder optical system according to claim 2, wherein magnification (M) of said real image of information formed in the vicinity of said image plane of said objective optical system is within a range of:

$$-1 \leq M < 0.$$

12. The real image type finder optical system according to claim 1, wherein said partial mirror surface having a reflection portion that is formed only on an area, of said partial mirror surface, on which light from said information displaying element is incident.

13. A real image type finder optical system, comprising:
an objective optical system having a positive power, at least one lens included in said objective optical system being movable in a direction of an optical axis of said objective optical system to change magnification of said finder optical system;
an erecting optical system for erecting a reversed real image formed by the objective optical system;
an eyepiece optical system for observing said real image formed by said objective optical system and erected by said erecting optical system;
an information display element provided in said objective optical system, said information display element displaying information to be observed in a field of view of said finder optical system; and
a partial mirror surface provided on an object side with respect to said information display element, said partial mirror surface allowing a part of light from said object to pass therethrough and reflecting light from said information display element towards said eyepiece optical system.

14. The real image type finder optical system according to claim 13, wherein light passing from said information display element and reflected by said partial mirror surface forms a real image of said information in the vicinity of an image plane on which said real image of said object is formed by said objective optical system.

15. The real image type finder optical system according to claim 14, wherein each surface of said objective optical system, said erecting optical system and said eyepiece optical system is arranged apart from the image plane of said objective optical system.

16. The real image type finder optical system according to claim 15, which satisfying a following condition:

$$0.28 < s/fe < 0.5,$$

wherein, s represents a distance in air between a surface of said information display element on which said information to be observed is formed and the image plane of said objective optical system, and fe represents a focal length of said eyepiece optical system.

17. The real image type finder optical system according to claim 13, wherein surfaces of elements constituting said objective optical system and the erecting optical system are located apart from an image plane of said objective optical system.

18. The real image type finder optical system according to claim 13, wherein said partial mirror surface is formed on a surface of a lens included in said objective optical system, said surface being one of a convex surface on the object side surface of said lens and a concave surface on the eyepiece objective optical system side surface of said lens.

19. The real image type finder optical system according to claim 13, wherein said information display element is a transparent member, mirror finished reflection patterns being formed on a surface of said transparent member.

20. The real image type finder optical system according to claim 19, wherein light incident from said object and reflected by said mirror finished reflection patterns is reflected by said partial mirror surface and form a real image in the vicinity of an image plane of said objective optical system.

21. The real image type finder optical system according to claim 13, wherein said partial mirror surface is a half mirror surface having an aspherical shape.

22. The real image type finder optical system according to claim 13, wherein said partial mirror surface has an aspherical shape.

23. A real image type finder optical system, comprising:

an objective optical system that forms a real image of an object on an image plane;

an information displaying optical system that forms a real image of patterns corresponding to information to be displayed in a vicinity of said image plane of said objective optical system said information displaying optical system comprising a part of said objective optical system;

an erecting optical system that erects said real image formed in a vicinity of said image plane; and an eyepiece optical system that allows a viewer to observe said real image formed on said image plane and erected by said erecting optical system.

24. The finder optical system according to claim 23, wherein said objective optical system includes a magnification changing optical system for changing magnification of said finder optical system, said magnification changing optical system and said information displaying optical system being distinct optical systems.

* * * * *